Dec. 5, 1961  R. D. LEMMERMAN ET AL  3,011,584
SOUND ATTENUATING DEVICE
Filed Dec. 16, 1957  3 Sheets-Sheet 1
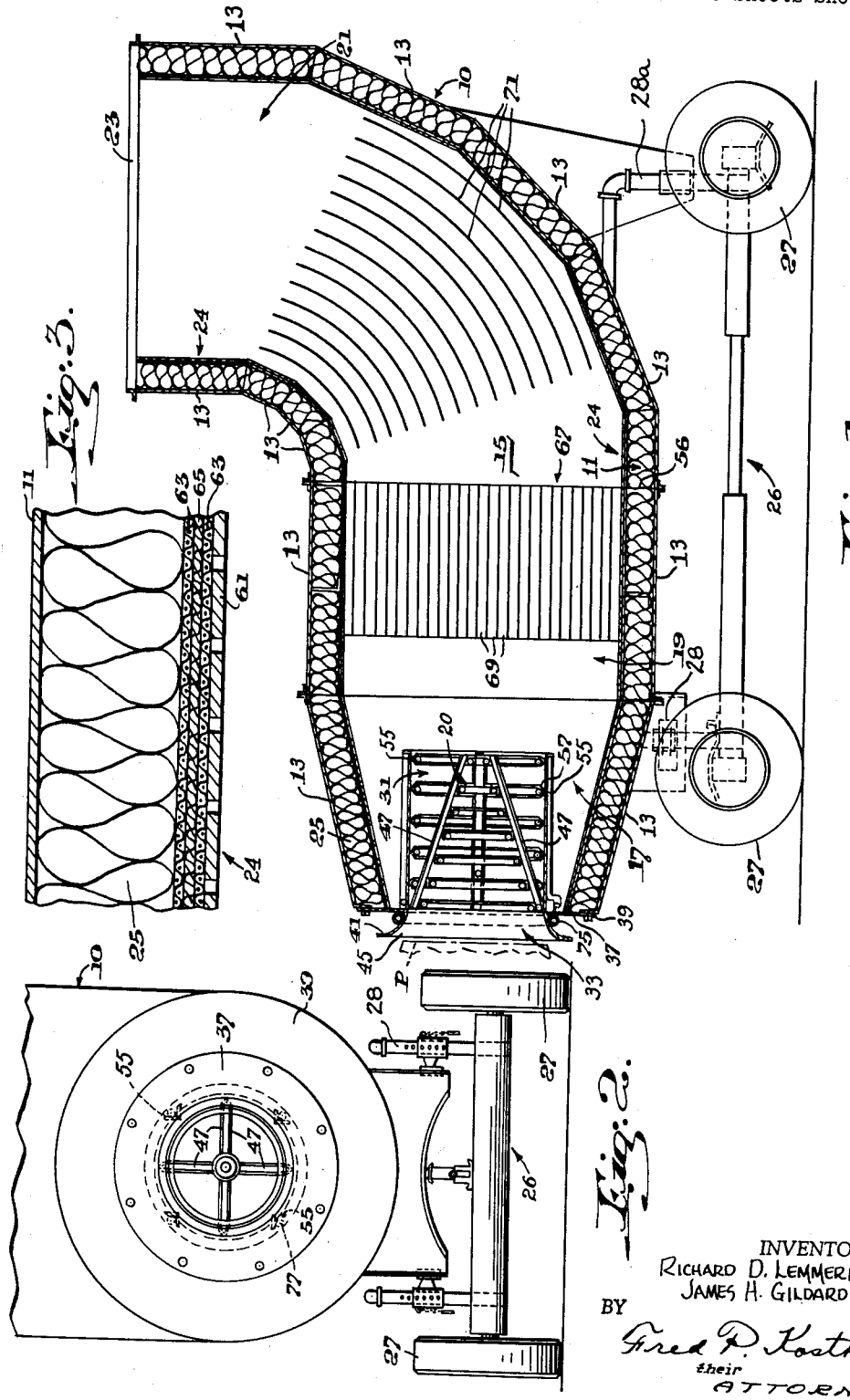
INVENTORS.
RICHARD D. LEMMERMAN
JAMES H. GILDARD
BY
Fred P. Kostka
their
ATTORNEY.

Dec. 5, 1961 R. D. LEMMERMAN ET AL 3,011,584
SOUND ATTENUATING DEVICE
Filed Dec. 16, 1957 3 Sheets-Sheet 2

INVENTORS
RICHARD D. LEMMERMAN
JAMES H. GILDARD
BY
Fred P. Kostka
their
ATTORNEY

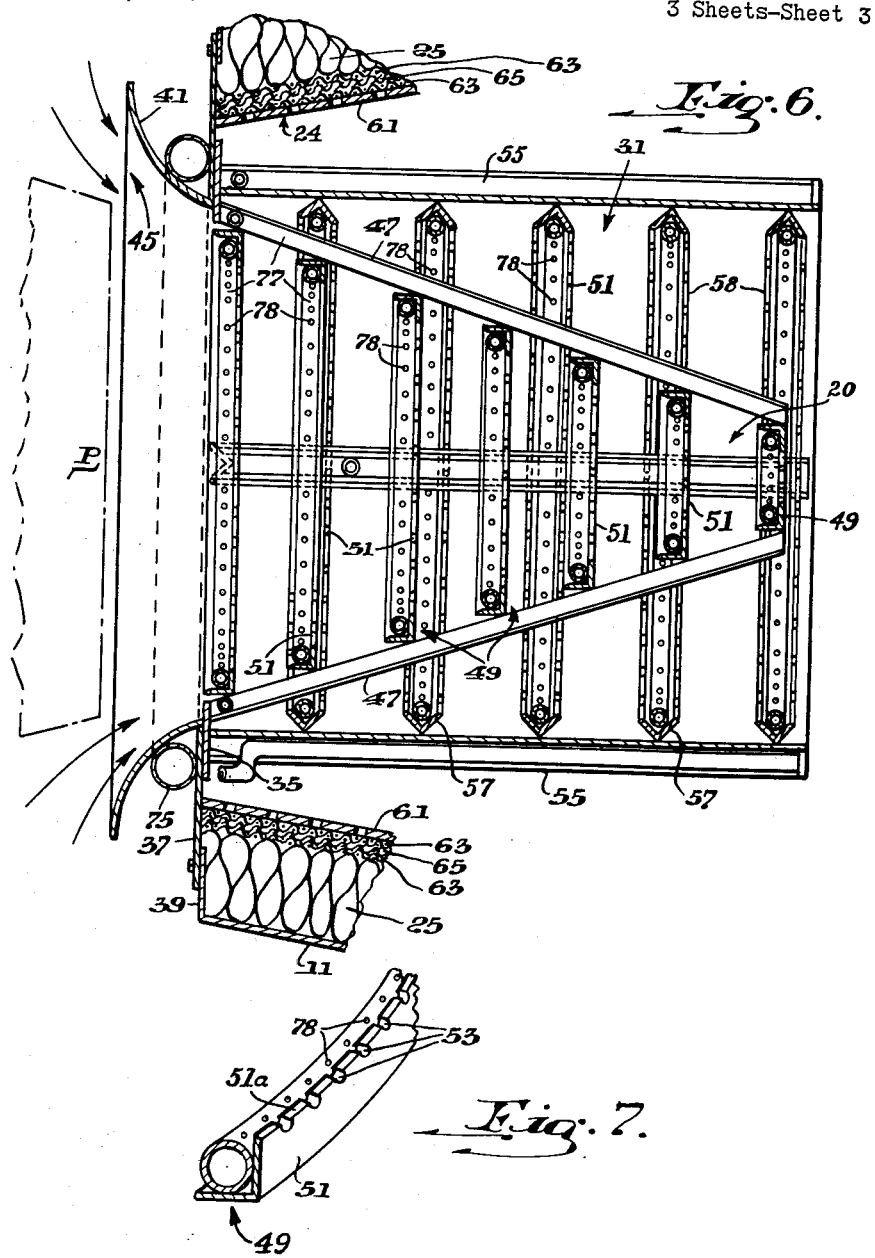

United States Patent Office 3,011,584
Patented Dec. 5, 1961

3,011,584
SOUND ATTENUATING DEVICE
Richard D. Lemmerman, Gibson Island, and James H. Gildard, Baltimore, Md., assignors to Koppers Company, Inc., a corporation of Delaware
Filed Dec. 16, 1957, Ser. No. 703,020
9 Claims. (Cl. 181—52)

This invention relates to a device for attenuating the sound produced by the operation of a combustion engine and more particularly for attenuating the sound emitted by a reactive propulsion engine.

In the operation of a reactive propulsion engine such as a turbo-jet, a ram-jet and turbo propeller engine or the like used to power aircraft, there are created sounds arranging from extremely low to high frequencies. These frequencies are both within and outside of the audible frequencies of sound and are objectionable since they disturb the entire community in which the jet aircraft is being operated. These sounds are prevalent during the test or run-up period of the jet aircraft.

During the run-up period, the aircraft is normally located on an apron of the airport runway especially provided for such purposes. These aprons are of limited size and while capable of holding a plurality of aircraft simultaneously, are incapable as a general rule of permitting other equipment from being permanently located thereon since it limits the maneuverability of the aircraft. Because of this, prior efforts to build permanent or fixed sites at the airport for the purpose of attenuating the sound during the test run-up have not always been satisfactory.

By the present invention it is proposed to substantially diminish the objectionable sounds created during the test or run-up period of a jet engine by providing a portable, vertically adjustable, compact and light weight sound attenuating device having an enclosed sound absorbing chamber for receiving the jet blast and including in combination a low-frequency attenuating system, a high and intermediate-frequency sound absorbing means, and a high-frequency directivity means. The portability of the sound attenuating device is achieved by mounting it upon a wheeled carriage such that it may be readily moved to any desired location. The compactness and effective small size of the run-up silencer of invention makes it possible to have an individual silencer for each of the jet engines of the aircraft being tested or run-up on the apron without interfering with the maneuverability of the individual aircraft on the apron.

The jet blast is discharged at high velocity from a jet engine exhaust port in the form of a rearward conical flow of hot air and gases creating a turbulent cyclonic flow of air in the surrounding ambient air. The turbulent cyclonic gas flow is in the form of vortices of increasing size toward the apex of the jet cone. These vortices are the source of low and extremely low frequencies which are within the audible and inaudible frequency ranges of sound. These low frequencies once generated are extremely difficult to absorb acoustically.

By the present invention, it is proposed to substantially eliminate these extreme low frequencies by reducing the turbulent cyclonic flow of air such that it prevents the generation of the large vortices. This is accomplished by providing a diffusing system which serves to substantially diminish the formation of the large vortices and thereby to prevent the generation of sound within the low and the extreme low frequency range. To this end the diffusing system comprises an arrangement which is located to intercept and deflect the flow of the high velocity jet blast such that there is a thorough mixing of the jet blast in the surrounding turbulent flow of air to thereby eliminate the formation of low frequencies.

The high and intermediate frequencies are readily controlled acoustically in a manner such that they are not disturbing to the surrounding community. The control of these frequencies is accomplished by the provision of a means for absorbing at least a portion of the intermediate and high frequency sounds within a sound attenuating chamber and by providing a means for directing the high frequency sound skyward, thus taking advantage of their directional characteristics to reduce the sound at ground level. At ground level the total effect of this combined acoustical system is that the low frequencies have been attenuated at the source, intermediate and some high frequencies have been attenuated by absorption and, further, high frequencies have been reduced by directivity.

It is important that the ambient pressure conditions at both the in-take end of the sound attenuating device and the jet exhaust port be comparable or at least simulate atmospheric conditions. This is essential since substantial resistance to the air flow at the air in-take end of the engine creates a negative pressure condition at the region of the jet exhaust or substantial resistance to free discharge of the jet. This condition will interfere with or affect normal operation of the jet engine such that it is impossible for the pilot to determine whether or not the jet engine is operating under the desired conditions during the run-up period.

In accordance with the present invention, the sound attenuating device is provided with a means for permitting the mixing of ambient air at the point at which this jet exhaust enters the device. This is accomplished by forming a circular in-take opening in the sound absorbing device. The opening is of larger diameter than the jet engine port housing such that in the operative jet blast receiving portion of the silencer the latter is spaced away from, and is located to form an annular opening about, the jet housing, yet mechanically free from that jet housing. Ambient air is aspirated through the annular opening into the sound absorbing chamber. It has been found that the quantity of air aspirated into the chamber must be controlled in order that the pressure simulate atmospheric pressure conditions. By the present invention this control is accomplished by forming the in-take opening in the shape of a bell mouth. With the opening shaped in this manner, it is possible to move the mobile silencer relative to the aircraft such that the annular opening may be of a predetermined size and thereby control the quantity of air aspirated into the chamber. The bell shaped opening is also of significance since, when the jet of an aircraft is initially started, the aircraft tends to tilt upwardly and if a multi-engined aircraft, it tends to yaw in the direction of the jet initially energized. By the present invention this movement of the jet engine relative to the silencer does not materially effect the sound absorbing characteristic of the silencer since the bell shaped mouth makes it possible to maintain a substantially constant opening thereby to retain a controlled flow of ambient air into the silencer. In the event that the movement is not accommodated by the bell shaped mouth such that the ambient air flow is not within desired limits, the silencer may be readily wheeled and relocated relative to the exhaust port. By the present invention there is provided a means for vertically adjusting the sound attenuating device to align the longitudinal axis of the sound absorbing chamber with the longitudinal axis of the jet engine.

In order to reduce the temperature of the gas flow and to some extent the pressure conditions at the in-take end of the silencer, there is also included in the present device a jet blast exhaust cooling system in the form of a combination of a gas-stream injected and circulating coolant which is arranged such that the jet blast and diffuser are immediately cooled thereby and in this manner decreases the energy of the blast of air and to some extent also reducing the velocity thereof.

Further objects and novel features of the invention will hereinafter appear more fully from the detailed description when the same are read in conjunction with the drawings.

In the drawings:

FIG. 1 is a cross-sectional side elevational view of the sound attenuating device of the present invention and showing it in operative position relative to the jet exhaust port of a jet engine employed to power an aircraft.

FIG. 2 is a front elevational view of the sound attenuating device.

FIG. 3 is a fragmentary enlarged section of the sound absorbing paneling as shown in FIG. 1 lining the interior of the sound absorbing stack.

FIG. 6 is an enlarged fragmentary side elevation cross-sectional view of the forward jet exhaust receiving end of the silencer showing in particular the details of the diffuser arrangement.

FIG. 7 is a fragmentary perspective view of the rims of the open-frame primary diffuser.

Figure 4:
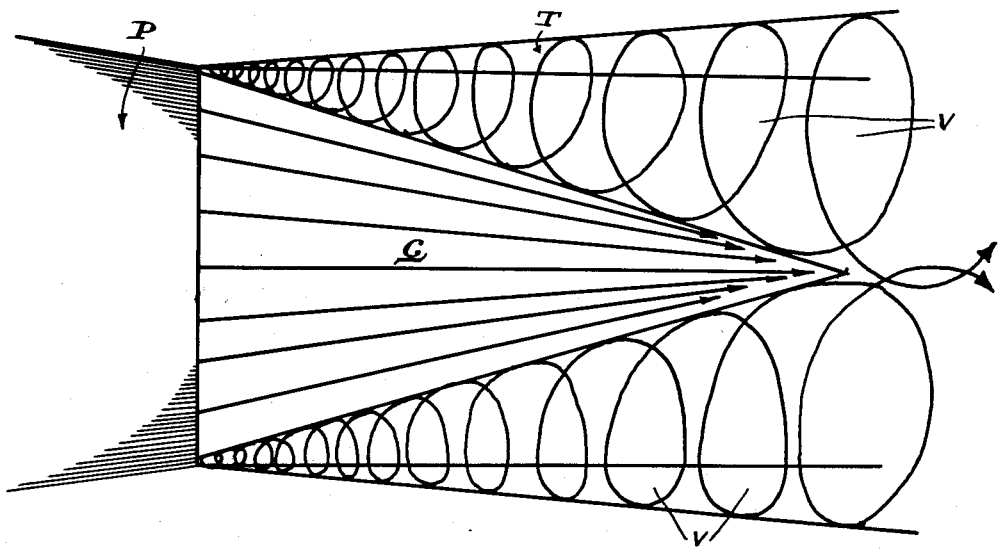
FIG. 4 is a view illustrating the flow of the exhaust gases as they are being discharged into the atmosphere from the jet engine exhaust port.

Referring now to the figures, the sound attenuating device of the present invention comprises a stack 10 having an outer shell 11 formed from a plurality of curved plate sections defining a sound reducing chamber 15 preferably of substantially circular cross section. The stack 10 has a forward jet blast receiving chamber 17 adapted to receive the high velocity conical shaped blast of hot air and gases discharged from the jet engine exhaust port, a second chamber 19 for straightening out the flow of the gases as they flow rearwardly and a vertical portion 21 having an upper open end 23 for discharging the exhaust gases. The interior of the shell 11 is provided with a sound absorbing paneling structure 24, the structure and function of which will be more fully discussed below.

The stack 10 is mounted on a frame 26 provided with wheels 27 so that the silencer may be readily moved from one location to another and for further significant reasons hereinafter to be pointed out. The frame 26 is further provided with vertically movable adjusting means 28 and 28a so that the axis of the stack 10 may be aligned with the longitudinal axis of the engine.

As shown in FIG. 4, hot exhaust gases are discharged into the atmosphere from the exhaust port P of the jet engine when the exhaust is not specially treated for sound attenuation in the form of a rearwardly converging cone C. These exhaust gases are discharged at extremely high velocities and high temperatures and as the gases enter the atmosphere create a cyclonic turbulent flow in the form of vortices which increase in size toward the apex of the conical jet blast. As is known, the high velocity exhaust gases are the source of high frequency sounds, and the turbulent flow of air is the source of lower frequencies which vary in frequency directly with the size of the vortices V. Hence, as shown in FIG. 4, the sound frequencies generated by the vortices of the turbulent air flow T will range from high frequencies having an amplitude slightly below those generated by the straight air blast of the jet cone to those of extreme low frequencies at the apex of the conical jet blast. These low frequencies are extremely difficult to absorb.

By the present invention there is provided a structure for substantially diminishing objectionable sounds created by the jet exhaust blast by eliminating the formation of the low frequency generating vortices of the turbulent air flow. This is accomplished by the provision of a diffuser arrangement comprising a primary diffuser 20 and secondary diffuser 31 located in the jet receiving chamber 17 of the stack 10.

As shown in FIGS. 1, 4 and 6, the jet blast receiving end of the stack is provided with a circular jet blast inlet opening 33 formed by an annular plate 35 mounted on a face plate 37 secured to the lip 39 depending from the front edge of the outer shell 11. Extending outwardly from the inner periphery of the annular plate is an outwardly flared curved flange 41 forming a bell mouth opening which in its operative position is selectively positioned relatively to the end of the jet exhaust port P to form an annular opening 45 about the exhaust port housing for permitting the aspiration of air into the stack as will be more fully explained hereafter.

Attached to the inner face of the annular plate 35 is the gas diffusion arrangement including the primary diffuser 20 and the secondary diffuser 31.

The primary diffuser comprises a plurality of spaced and rearwardly converging angle irons 47 connected along their lengths by welding or the like by spaced circular angle irons rims 49 having a leg 51 extending transversely of the exhaust stream. It is to be understood that various other structures may be substituted for the described structure. These structures include perforated baskets, conical screens, structural iron pyramids, structural iron grids, and steel screen grids.

Figure 5:
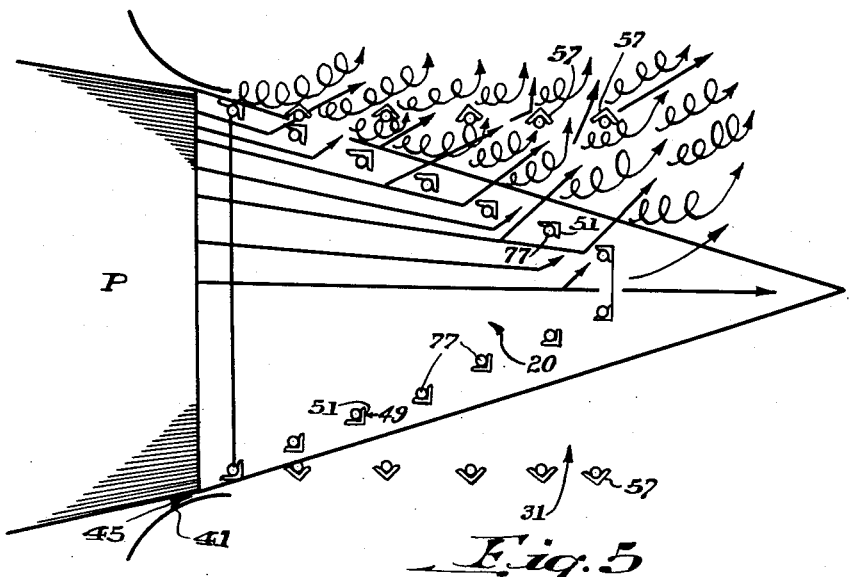
FIG. 5 is a view similar to FIG. 4 but illustrating the action of the gas flow diffuser incorporated in the silencer of the present invention.

In the embodiment herein the angle irons form an open frame frustum of a cone concentric with the inlet opening such that in the operative position of the silencer, some of the high velocity gases which are discharged from the jet exhaust port, strike the jagged edges 51a of leg 51 which as shown in FIG. 7 are formed with spaced semi-cylindrical cutouts 53. The jagged edges serve to turn, direct, and mix the intercepted hot gases into the surrounding ambient air. As shown in FIG. 5 this action creates a series of smaller vortices which are the source of high and intermediate frequency sounds.

In order further to diminish the formation of large low frequency generating vortices and to assist in directing the gas flow rearwardly, the secondary diffuser 31 is located about and concentric with the primary diffuser 20. The secondary diffuser 31 is also an open frame structure comprising a plurality of spaced horizontal angle irons 55 joined by the vertical angle iron rims 57 which may be formed with jagged edges 58 as shown in FIG. 6. The rim angle irons 57 function similarly to the rims 49 of the primary diffuser to further diminish the vortices formation by thoroughly mixing and maintaining all the frequencies in the high and intermediate frequency sound range.

For assisting the flow of gases through the stack and to minimize pressure losses at the inlet end of the silencer, the forward section or gas receiving section is formed as a frusto-conical section diverging outwardly toward the rear of the stack.

The forward section, as well as the elbow section, utilize the sound absorbing panel structure 24 for absorbing intermediate frequency range sounds generated by the small vortices emanating from the primary and secondary diffusers. The sound absorbing panel structure 24 is constructed such that it is capable of withstanding the high velocities and temperatures occurring during the silencing period.

The sound absorbing panel may be of any suitable type such as that disclosed in U.S. Patent No. 2,674,336. As shown in FIGS. 1 and 3, the panel structure 24 comprises the outer steel plate 11 spaced by a rigid annular connecting ring 56 from an acoustically transparent metal plate 61 such as perforated steel plate or the like. Disposed within the space between the plate 61 and the outer shell 11 is an acoustical blanket 25 formed of mineral or glass wool, which is symbolically indicated in the drawing. Sandwiched between two layers of acoustically transparent metallic screen 63 is a layer of velocity and heat resistant glass cloth 65. A number of other means for protecting the acoustically absorbent blanket from the effects of the high-velocity gas flow would include the scrubble construction of the aforementioned patent, or the use of a corrugated, perforated steel sheet, either alone or in combination with heat resistant fabric, metal-screen wire and non-corrugated, perforated plates.

As the gases flow rearwardly they pass into the intermediate section 19 of the stack 10 in which there is located a splitter arrangement 67 for straightening out the swirling gases. While this splitter structure may be variously constructed, as shown, it comprises a plurality of closely spaced vanes 69 extending radially from the inner periphery of the acoustical panel structure 24. For the purpose of directing the flow of gases upwardly through the vertical portion of the stack, with least resistance, there is provided in the elbow of the stack 10 a plurality of longitudinally arcuate turning vanes 71.

As mentioned heretofore, the inlet opening 33 is formed with a bell shaped mouth to provide in its operative position an annular opening 45 about the exhaust port P for the purpose of permitting the aspiration of air into the exhaust chamber. The aspiration of the air into the exhaust chamber accomplishes two primary functions. Firstly, it assists in cooling the jet exhaust blast; and secondly, it assists in maintaining the pressure at the inlet end of the stack 10 substantially constant at normal atmospheric pressure. It is essential that no excessive pressure be created in the vicinity of the jet exhaust since if this occurs, it will adversely affect the operation of the engine. In one instance it was found that with the structure of the present invention the optimum operating conditions are achieved by placing the bell mouth within two inches of the exhaust port of the jet engine. This spacing forms the annular opening 45 permitting the aspiration of the desired amount of air for mingling with the jet exhaust gases to cool the same and to maintain the pressure substantially at amospheric pressure. To maintain the portable silencer in its fixed operative jet blast receiving position, the frame may be provided with a hold-down device, wheel brakes or the like.

For the purpose of cooling the hot exhaust gas from the jet exhaust port there is provided, in addition to the aspiration of air, another method and means for cooling the gases. This consists of injecting water into the hot gases while the gases are flowing through the primary and secondary diffusers. To this end, a water header 75 is carried on the flared curved flange 41 and is connected to a suitable source of water, not shown. Connected to the header 75 are a plurality of circulating pipes 77 which are preferably interconnected in any convenient manner (not shown) and are supported on the angle irons 47, 49, 55 and 57 of both the primary and secondary diffusers. The pipes are each provided with small openings 78 about their inner circumferences so as to inject a spray of water into the exhaust gas.

What is claimed is:

1. A device for attenuating the sound created by the substantially conical blast of exhaust gases discharged from the exhaust port of a reaction propulsion engine, comprising a stack of substantially circular cross section, a circular sound inlet for said stack, said inlet being of greater diameter than said exhaust port for forming an annular opening with said exhaust port for aspirating ambient air into said inlet when said stack is positioned adjacent said exhaust port, a circular outlet for said stack arranged substantially normal to said inlet so that said sound is discharged upwardly therefrom into the atmosphere, a plurality of members defining first and second concentric open frames mounted in said stack immediately inside the mouth of said inlet, said first open frame being composed of a first set of parallel spaced rings of different radii, first longitudinally extending framing elements holding said first set of rings in the shape of a frustum of a cone with the smallest ring being furthest downstream, said second open frame being composed of a second set of spaced parallel rings surrounding said first open frame and spaced therefrom, second longitudinally extending framing elements holding said second set of rings in the shape of the curved surface of a solid of revolution, said open frames being oriented in the mouth of said inlet for receiving the substantially conical blast therein from said exhaust port directly upon discharge thereof when said stack is positioned adjacent said exhaust port with the axis of the conical blast substantially coinciding with the common axis of said first and second open frames and means in said stack intermediate the inlet and outlet for directing the flow of gases upwardly.

2. A device for attenuating the sound created by the substantially conical blast of exhaust gases discharged from the exhaust port of a reaction propulsion engine, comprising a stack of substantially circular cross section, a circular sound inlet for said stack, said inlet being of greater diameter than said exhaust port for forming an annular opening with said exhaust port for aspirating ambient air into said inlet when said stack is positioned adjacent said exhaust port, a circular outlet for said stack arranged substantially normal to said inlet so that said sound is discharged upwardly therefrom into the atmosphere, a plurality of members defining first and second concentric open frames mounted in said stack immediately inside the mouth of said inlet, said first open frame being composed of a first set of parallel spaced rings of different radii, first longitudinally extending framing elements holding said first set of rings in the shape of a frustum of a cone with the smallest ring being furthest downstream, each of said rings in said first set having an inner jagged surface, said second open frame being composed of a second set of spaced parallel rings surrounding said first open frame and spaced therefrom, second longitudinally extending framing elements holding said second set of rings in the shape of the curved surface of a solid of revolution, said open frames being oriented in the mouth of said inlet to receive the substantially conical blast therein from said exhaust port directly upon discharge thereof when said stack is positioned adjacent said exhaust port with the axis of the conical blast substantially conciding with the common axis of said first and second open frames and with said inner jagged surfaces protruding into the conical blast and means in said stack intermediate the inlet and outlet for directing the flow of gases upwardly.

3. A device for attenuating sound substantially as recited in claim 2 wherein the inner jagged surface of each of the rings of the first set is produced by semi-cylindrical cut-outs formed in the inner circumference thereof.

4. A device for attenuating the sound created by the substantially conical blast of exhaust gases discharged from the exhaust port of a reaction propulsion engine, comprising a stack of substantially circular cross section, a circular sound inlet for said stack, said inlet being of greater diameter than the exhaust port for forming an annular opening therewith for aspirating ambient air into said inlet when said stack is positioned adjacent said exhaust port, a circular outlet for said stack arranged substantially normal to said inlet so that said sound is discharged upwardly therefrom into the atmosphere, a plurality of members defining first and second concentric open frames mounted in said stack immediately inside the mouth of said inlet, said first open frame being composed of a first set of parallel spaced rings of different radii, first longitudinally extending framing elements holding said first set of rings in the shape of a frustum of a cone with the smallest ring being furthest downstream, said second open frame being composed of a second set of spaced parallel rings surrounding said first open frame and spaced therefrom, second longitudinally extending framing elements holding said second set of rings in the shape of the curved surface of a cylinder, each of said rings in said sets having an inner jagged surface, said open frames being oriented in the mouth of said inlet to receive the substantially conical blast therein from said exhaust port directly upon discharge thereof when said stack is positioned adjacent said exhaust port with the axis of the conical blast substantially coinciding with the common axis of said first and second open frames and with said inner jagged surfaces of said first set of rings protruding into the conical blast and means in said stack intermediate the inlet and outlet for directing the flow of gases upwardly.

5. A device for attenuating sound substantially as recited in claim 4 wherein the inner jagged surface of each of the rings of both sets is produced by semi-cylindrical cut-outs formed in the inner circumference thereof.

6. In a device for attenuating sound created by the substantially conical blast of exhaust gases discharged from the circular exhaust port of a reaction propulsion engine wherein the device has a shell enclosing a forward jet blast-receiving portion communicating with an intermediate portion which in turn communicates with a discharge portion; with provision for attenuation of the intermediate sound frequencies and some high sound frequencies by means of sound absorbing panels on the inner surface of the shell; with provision for the aspiration of ambient air around the exhaust gases entering the jet blast-receiving portion, and with provision for cooling the exhaust gases by spraying water therein, the improvement comprising means for deflecting exhaust gases outwardly from the conical blast discharged directly into said deflecting means, said means consisting of a first diffuser and a second diffuser substantially co-axial therewith, said first diffuser consisting of spaced parallel annular members of different radii, longitudinal framing members holding said annular members in the shape of a frustum of a cone with the smallest annular member being furthest downstream and the largest annular member being located immediately within the opening for admitting the conical blast into the jet blast-receiving portion, said second diffuser consisting of a plurality of spaced parallel annular members, longitudinal bracing elements holding said plurality of members in the shape of the curved surface of a solid of revolution, said second diffuser surrounding said first diffuser in spaced relationship therewith and said deflecting means being in operative position to attenuate the low frequencies when the conical blast is received therein directly upon discharge from said exhaust port with the axes of the conical blast and said first and second diffusers being substantially coincident.

7. In a device for attenuating sound created by the substantially conical blast of exhaust gases discharged from the circular exhaust port of a reaction propulsion engine wherein the device has a shell enclosing a forward jet blast-receiving portion communicating with an intermediate portion which in turn communicates with a discharge portion; with provision for attenuation of the intermediate sound frequencies and some high sound frequencies by means of sound absorbing panels on the inner surface of the shell; with provision for the aspiration of ambient air around the exhaust gases entering the jet blast-receiving portion, and with provision for cooling the exhaust gases by spraying water therein, the improvement comprising means for deflecting exhaust gases outwardly from the conical blast discharged directly into said deflecting means, said means consisting of a first diffuser and a second diffuser substantially co-axial therewith, said first diffuser consisting of a first set of spaced parallel annular members of different radii, longitudinal framing members holding said first set of members in the shape of a frustum of a cone with the smallest annular member being furthest downstream and the largest annular member being located immediately within the opening for admitting the conical blast into the jet blast-receiving chamber, each of said annular members in said first set having an inner jagged surface, said second diffuser consisting of a second set of spaced parallel annular members, longitudinal bracing elements holding said second set of members in the shape of the curved surface of a solid of revolution, said second diffuser surrounding said first diffuser in spaced relationship therewith and said deflecting means being in operative position to attenuate the low frequencies when the conical blast is received therein directly upon discharge from said exhaust port with the axes of the conical blast and said first and second diffusers being substantially coincident and with said inner jagged surfaces protruding into the conical blast.

8. In a device for attenuating sound created by the substantially conical blast of exhaust gases discharged from the circular exhaust port of a reaction propulsion engine wherein the device has a shell enclosing a forward jet blast-receiving portion communicating with an intermediate portion which in turn communicates with a discharge portion; with provision for attenuation of the intermediate sound frequencies and some high sound frequencies by means of sound absorbing panels on the inner surface of the shell; with provision for the aspiration of ambient air around the exhaust gases entering the jet blast-receiving portion, and with provision for cooling the exhaust gases by spraying water therein, the improvement comprising means for deflecting exhaust gases outwardly from the conical blast discharged directly into said deflecting means, said means consisting of a first diffuser and a second diffuser substantially co-axial therewith, said first diffuser consisting of a first set of spaced parallel annular members of different radii, longitudinal framing members holding said first set of members in the shape of a frustum of a cone with the smallest annular member being furthest downstream and the largest annular member being located immediately within the opening for admitting the conical blast into the jet blast-receiving chamber, said second diffuser consisting of a second set of spaced parallel annular members, longitudinal bracing elements holding said second set of members in the shape of the curved surface of a cylinder, spaced semi-cylindrical cut-outs formed in the inner circumference of each of said members in said sets, said second diffuser surrounding said first diffuser in spaced relationship therewith and said deflecting means being in operative position to attenuate the low frequencies when the conical blast is received therein directly upon discharge from said exhaust port with the axes of the conical blast and said first and second diffusers being substantially coincident and with the inner circumference of said members of said first set protruding into the conical blast.

9. In a device for attenuating sound created by the substantially conical blast of exhaust gases discharged from the circular exhaust port of a reaction propulsion engine wherein the device has a shell enclosing a forward jet blast-receiving portion communicating with an intermediate portion which in turn communicates with a discharge portion; with provision for attenuation of the intermediate sound frequencies and some high sound frequencies by means of sound absorbing panels on the inner surface of the shell; with provision for the aspiration of ambient air around the exhaust gases entering the jet blast-receiving portion, and with provision for cooling the exhaust gases by spraying water therein, the improvement comprising means for deflecting exhaust gases outwardly from the conical blast discharged directly into said deflecting means, said means consisting of a first diffuser and a second diffuser substantially co-axial therewith, said first diffuser consisting of solid portions interconnected in the form of the curved surface of a frustum of a cone with the area of said curved surface being predominately open, said first diffuser being disposed immediately within the opening for admitting the conical blast into the jet blast-receiving chamber with the smaller end of said frustum pointing downstream, said second diffuser consisting of a plurality of solid portions interconnected in the form of the curved surface of a solid of revolution with the area of said curved surface being predominately open, said second diffuser surrounding said first diffuser in spaced relationship therewith and said deflecting means being in operative position to attenuate the low frequencies when the conical blast is received therein directly upon discharge from said exhaust port with the axes of the conical blast and said first and second diffusers being substantially coincident.

References Cited in the file of this patent

UNITED STATES PATENTS

| | | |
|---|---|---|
| 2,519,161 | Tucker | Aug. 15, 1950 |
| 2,557,687 | Rainville | June 19, 1951 |
| 2,674,335 | Lemmerman | Apr. 6, 1954 |
| 2,685,936 | Brenneman et al. | Aug. 10, 1954 |
| 2,713,397 | Klausmeyer | July 19, 1955 |
| 2,720,276 | Droeger | Oct. 11, 1955 |
| 2,810,449 | Coleman | Oct. 22, 1957 |

FOREIGN PATENTS

| | | |
|---|---|---|
| 20,963 | Great Britain | 1908 |
| 638,954 | Great Britain | June 21, 1950 |
| 1,128,475 | France | Aug. 27, 1956 |

OTHER REFERENCES

Popular Science (publication), pp. 126, 127, October 1956.